(12) United States Patent
Heinrichs et al.

(10) Patent No.: US 11,761,477 B2
(45) Date of Patent: Sep. 19, 2023

(54) BALL PIN

(71) Applicant: Böllhoff Verbindungstechnik GmbH, Bielefeld (DE)

(72) Inventors: Heinrich Heinrichs, Vlotho (DE); Michael Kahre, Herford (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 218 days.

(21) Appl. No.: 17/015,207

(22) Filed: Sep. 9, 2020

(65) Prior Publication Data

US 2021/0071708 A1    Mar. 11, 2021

(30) Foreign Application Priority Data

Sep. 9, 2019   (DE) .......................... 202019104970.7

(51) Int. Cl.
*F16C 11/06* (2006.01)
*F16B 39/22* (2006.01)
*F16B 39/28* (2006.01)

(52) U.S. Cl.
CPC ...... *F16C 11/0604* (2013.01); *F16C 11/0685* (2013.01); *F16C 11/0695* (2013.01);
(Continued)

(58) Field of Classification Search
CPC ........ F16B 39/22; F16B 39/225; F16B 39/28; F16B 39/30; F16C 11/0604;
(Continued)

(56) References Cited

U.S. PATENT DOCUMENTS 2,001,290 A * 5/1935 Thomson ................ F16B 4/004
411/930
2,263,137 A * 11/1941 Oestereicher ........... F16B 15/06
411/311
(Continued)

FOREIGN PATENT DOCUMENTS

CA          992686 A      7/1976
CN       101994737 A      3/2011
(Continued)

OTHER PUBLICATIONS

Chinese Office Action for CN Application No. 202010942622.1 dated May 16, 2022 (9 pages).

*Primary Examiner* — Josh Skroupa
(74) *Attorney, Agent, or Firm* — Reising Ethington P.C.

(57) ABSTRACT

A coupling bolt or pin, in particular a ball pin, with a coupling head, such as a ball head, and a thread shaft. The thread shaft comprises a thread in a longitudinal portion of the thread shaft, which extends parallel to a central longitudinal axis of the thread shaft. Within the longitudinal portion of the thread a thread inhibition is provided by means of which a frictional connection between the thread and a counter thread engaging therein and being present at a radial inner wall of a thread opening is increasable. A disc-shaped support structure is provided between the coupling pin and the thread, a radial extension of which is adaptable to a diameter of the thread opening so that the coupling pin is supportable against a lateral load with respect to the axis of the coupling pin within the thread opening.

16 Claims, 4 Drawing Sheets

(52) U.S. Cl.
CPC .............. *F16B 39/225* (2013.01); *F16B 39/28* (2013.01); *Y10T 403/32204* (2015.01)

(58) Field of Classification Search
CPC .............. F16C 11/0685; F16C 11/0695; Y10T 403/32196; Y10T 403/32204; Y10T 403/32311; Y10T 403/32631; Y10T 403/4966
USPC ...... 403/76, 77, 90, 122, 282; 411/308, 309, 411/310, 311, 333, 334, 924.1
See application file for complete search history.

(56) References Cited

U.S. PATENT DOCUMENTS

| | | | | |
|---|---|---|---|---|
| 3,317,938 | A * | 5/1967 | McKay | F16B 39/225 470/11 |
| 3,814,156 | A | 6/1974 | Bachmann et al. | |
| 3,908,727 | A * | 9/1975 | Osborne | F16B 39/34 411/304 |
| 4,646,887 | A * | 3/1987 | Hirose | E05F 11/505 403/282 |
| 4,720,225 | A * | 1/1988 | Burt | F16B 33/006 411/908 |
| 5,335,411 | A * | 8/1994 | Muller | F16B 37/062 403/282 |
| 5,407,312 | A * | 4/1995 | Terrizzi | F16B 39/225 411/304 |
| 5,452,977 | A * | 9/1995 | Terrizzi | F16B 39/225 411/930 |
| 5,672,036 | A * | 9/1997 | Medal | F16B 39/225 411/339 |
| 6,447,227 | B1 * | 9/2002 | Crutchley | F16B 19/10 411/311 |
| 6,817,817 | B2 | 11/2004 | Dembowsky et al. | |
| 6,851,167 | B2 * | 2/2005 | Harlow | B25B 27/0014 403/282 |
| 7,241,097 | B2 | 7/2007 | Dembowsky et al. | |
| 7,393,152 | B2 | 7/2008 | Sellers et al. | |
| 7,658,581 | B2 | 2/2010 | Süßenbach | |
| 8,042,841 | B2 * | 10/2011 | Viegener | F16L 15/001 285/333 |
| 8,608,419 | B2 | 12/2013 | Babej | |
| 9,140,285 | B2 * | 9/2015 | Burton | F16B 21/02 |
| 9,995,331 | B2 | 6/2018 | Heimann et al. | |
| 11,242,885 | B2 * | 2/2022 | Alaimo | F16B 39/225 |
| 2005/0089384 | A1 * | 4/2005 | Pratt | F16B 39/225 411/82 |
| 2008/0213065 | A1 | 9/2008 | Sussenbach | |
| 2012/0003059 | A1 | 1/2012 | Tamaki | |
| 2021/0071708 | A1 | 3/2021 | Heinrichs et al. | |

FOREIGN PATENT DOCUMENTS

| | | |
|---|---|---|
| CN | 102312894 A | 1/2012 |
| CN | 104033466 A | 9/2014 |
| CN | 106321604 A | 1/2017 |
| CN | 214118694 U | 9/2021 |
| DE | 2238041 A1 | 2/1973 |
| DE | 2247468 A1 | 4/1973 |
| DE | 10147141 A1 | 4/2003 |
| DE | 102004021484 A1 | 11/2005 |
| DE | 102010018643 A1 | 11/2011 |
| DE | 102014202798 A1 | 8/2015 |
| EP | 1669614 A1 | 6/2006 |
| EP | 3064790 A1 | 9/2016 |
| WO | WO-0057070 A1 * | 9/2000 ............ F16B 39/225 |

* cited by examiner

BALL PIN

CROSS REFERENCE TO RELATED APPLICATIONS

This application claims the priority of German Utility Model patent application No. DE202019104970.7, filed on Sep. 9, 2019. The entire content of this priority application is incorporated herein by reference in its entirety.

TECHNICAL FIELD

The present disclosure relates to a coupling bolt or pin, in particular a ball pin, with a coupling head, which may be a ball head, and a thread shaft for manufacturing a plug-in connection with, for example, a suitable coupling. Furthermore, the present disclosure relates to a thread or screw connection comprised of the ball pin and a component with a thread opening. The present disclosure also relates to an injection molding method for manufacturing the ball pin as well as to an installation method for installing the ball pin in a component opening having a counter thread.

BACKGROUND

In the prior art, coupling pins in the form of ball pins are known and are used in a number of applications. These ball pins are comprised of a ball head and a shaft portion which serves to fasten the ball pin. According to different alternatives, a thread or another suitable connection structure is formed from this shaft portion. The ball shaft is screwed into an opening in the component with a counter thread matching the ball shaft to fasten the ball pin to the component.

In this arrangement of the ball pin at the component, the ball head protrudes beyond the component surface. There it is used, for example, for manufacturing a releasable snap connection with a corresponding coupling in which a ball socket is formed for receiving the ball head. Such connections are used in the automotive industry, for example. This is because the snap connections, which are easy both to be produced and released, are suitable for fastening covers in the vehicle interior or engine compartment.

In addition to the use of a ball head, other connection structures are also used in the prior art. DE 10 2014 202 798 A1, for example, describes a bolt head which comprises a circumferential annular groove for fastening a component. The shaft with thread engages in a thread opening of a component. Sealing ribs are provided to prevent liquid from penetrating into the threaded portion. These are supported at the inner wall of the component opening, where the counter thread for the thread shaft is also provided. Although the sealing ribs provided here prevent the penetration of moisture or dirt into the threaded portion, at the same time any lateral or radial loads on the head of the coupling pin must be dissipated into the component via the shaft portion. This leads to mechanical loads on the shaft portion, which can both stress and weaken the threaded portion of the component or even may cause the threaded portion to loosen from the component opening.

EP 1 669 614 A1 describes a threaded bolt which is screwed into a blind rivet nut. The thread shaft of the threaded bolt is distinguished by a sealing portion which precedes the threaded portion in the screw-in direction. This sealing portion comprises a plurality of radially protruding sealing ribs, which are sealingly supported at an adjacent wall of the blind rivet nut. Against the screw-in direction above the sealing portion, a threaded portion is provided at the shaft of the connection pin, which is connectable with a matching counter thread of the blind rivet nut. Via this self-inhibiting thread connection between thread shaft and threaded portion of the blind rivet nut, the screw-in depth of the connection pin in the blind rivet nut can be adjusted. This adjustment possibility for the depth of the connection pin within the blind rivet nut, provided by the frictional connection between thread shaft and blind rivet nut, is subject to mechanical stress. This requires the use of stable and mechanically resistant plastics in order to avoid a flow of plastics in the connection between connection pin and blind rivet nut which weakens the connection.

DE 101 47 141 A1 describes a ball pin the thread shaft of which is screwed into a blind rivet nut. This blind rivet nut comprises a hollow cylindrical threaded portion, which establishes the thread connection with the thread shaft. Against the screw-in direction above the threaded portion, a likewise hollow cylindrical sealing portion is provided. Due to its smooth inner wall, the hollow cylindrical sealing portion provides a contact face for sealing ribs at the ball pin which extend circumferentially around the shaft. These sealing ribs are formed flexibly and are deformed at the inner wall when the ball pin is screwed into the blind rivet nut. In this manner, they seal the established thread connection against the outside, for example against the penetration of liquids. Furthermore, the sealing ribs create a frictional connection to the adjacent inner wall of the hollow cylindrical sealing portion. This frictional connection makes it difficult to turn the coupling pin within the blind rivet nut due to the occurring frictional forces. In addition to the sealing effect of the sealing ribs on the pin shaft, a turning inhibition is thus also achieved, with the aid of which a loosening of the coupling pin is made more difficult.

With reference to the prior art described above, an object of at least some implementations of the present disclosure is to propose an alternative construction of a coupling pin, in particular a ball pin, to existing alternatives, which in addition to a stable axial positioning in a thread opening also ensures a reliable retention in the thread opening despite the effect of mechanical retention forces on the coupling head.

SUMMARY

The above object is solved by a coupling pin, in particular a ball pin, with a coupling head and a thread shaft. Further, the above object is solved by a screw connection of the above-mentioned coupling pin and a component with a thread shaft. In addition, the present disclosure includes an injection molding method for manufacturing the above-mentioned coupling pin as well as an installation method of the above-mentioned coupling pin in a component opening. Further embodiments and designs are set forth in the following description, the accompanying drawings as well as the appending claims.

The present disclosure includes a coupling bolt or pin, in particular a ball pin, with a coupling head, which may be a ball head, and a thread shaft. The thread shaft comprises a thread in a longitudinal portion of the thread shaft, which extends parallel to a central longitudinal axis of the thread shaft. Within the longitudinal portion of the thread a thread inhibition is provided by means of which a frictional connection between the thread of the thread shaft and a counter thread engaging therein and being present at a radial inner wall of a thread opening is increasable. In addition, a disc-shaped radial support structure is provided between the coupling pin and the longitudinal portion of the thread, a radial extension of which is adaptable to a diameter of the thread opening so that the coupling pin is supportable against a lateral load with respect to the central longitudinal axis of the coupling pin within the thread opening, especially at the inner wall of the thread opening.

The coupling pin of the present disclosure is explained using the example of a ball pin. In this, a ball head serves as coupling head. Alternatively, coupling pins comprising a lenticular, angular or otherwise shaped coupling head may be preferred. Thus, the ball pin described below is an example of all coupling pins with the disclosed constructive characteristics.

The ball pin is distinguished by a thread shaft for fastening the ball pin in a thread opening and by a ball head for connecting to a component. If the ball pin is fastened to or connected to another component via a suitable coupling and the ball head, mechanical loads are diverted from this connection via the ball head onto the thread shaft in the respective thread opening and this component. Due to the round shape of the ball head, mechanical loads can be transferred in different directions of the ball head to the connected thread shaft. In order to ensure an optimum connection between the ball head and another component, the ball pin is arrangeable in a defined axial position within a thread opening due to its thread inhibition in the longitudinal portion of the thread at the thread shaft. The thread inhibition may increase the friction of the outer faces of the thread shaft and the counter thread of a thread opening, which abut at each other. Accordingly, it is ensured that the ball pin is screwable into a desired axial position within the thread opening and is retained there even under mechanical load.

Since the ball pin is also adapted to be screwed into a thread opening which may comprise a hollow cylindrical support portion adjacent to the entry opening into the thread opening, the disc-shaped radial support structure provided at the thread shaft ensures a lateral stabilization of the ball pin in the thread opening. For this purpose, the disc-shaped radial support structure is deformable in its structural configuration to such an extent that, on the one hand, it can be form-fitted to an optimum fit in the thread opening and, on the other hand, it can provide tolerance-reduced lateral support with respect to the longitudinal axis of the ball pin via the form-fitting. This is because even if the support structure of the ball pin initially collides with the inner wall of the thread opening when it is screwed into the thread opening, it is adapted to the circumference or the opening itself by deformation. This ensures a reliable proximity between the radial outer side of the support structure and the adjacent inner side of the wall of the thread opening.

According to a further embodiment, the thread inhibition is comprised of a web-like structure or rib extending over several thread turns, which at least partially fills thread valleys and/or increases thread crests.

The thread of the thread shaft as well as the counter thread engaging therein at the radial inner wall of a thread opening are adapted to each other in order to be able to establish a reliable thread connection. Since such a thread connection often comprises a certain amount of clearance, it is not possible to ensure an axial depth position of the coupling pin or ball pin within the thread opening. For this reason, the thread inhibition in the form of a web or structure on the thread of the thread shaft may be used to increase a frictional engagement between the thread shaft and the thread opening and thus to secure an axial screw-in position of the thread shaft in the thread opening in a better way.

The type and number of the mechanical thread inhibition determines the frictional connection with which the thread shaft is retained within the thread opening or within the counter thread. This frictional connection thus ensures that even in the event of mechanical influences on the thread connection, such as vibrations or other shocks, the connection and especially the axial position of the ball pin within the thread opening is maintained.

The web-like structure or rib achieves the thread inhibition by filling existing thread valleys with the thread inhibition or by arranging the mechanical structure on the thread crests or flanks. This constructive modification of the thread portions on the pin shaft and at the inner wall of the thread opening, which are formed to fit precisely, leads to an inaccuracy which ensures the additional frictional retention forces between the ball pin and the thread opening that were discussed above. This is because the thread-inhibiting web-like structure may be deformable and/or removable during a screwing into the counter thread of the thread opening. Although the structure or rib is deformed or at least partially removed during manufacturing of the thread connection, it is still retained between the thread portions of the pin shaft and the thread opening abutting each other.

According to a further design, the thread inhibition is at least one rib extending in the longitudinal direction of the thread shaft, which is arranged centrally or eccentrically in the direction opposite to the head with respect to the axial extension of the thread on the thread of the thread shaft.

It has been proven to be advantageous that a mechanical thread inhibition develops a reliable effect precisely when it is screwed as deeply as possible into a thread opening and is deformed in the process. In this way, the mechanical thread inhibition helps to ensure that the thread shaft of the ball pin is mechanically braced with the thread opening over an axial portion, within the thread opening which is as long as possible. As a result, the construction may be to place at least one thread inhibition adjacent to or neighboring to the thread end of the ball pin, which is facing away from the ball head. Another design may be to provide an even number of thread inhibiting structures or ribs extending parallel to the longitudinal axis of the thread shaft. In this context, it may also be preferred that the even number of thread inhibitions may be arranged in pairs opposite each other. This may create an even distribution of mechanical clamping stresses between the thread opening and the thread shaft resulting from the frictional connection caused by the thread inhibition.

Correspondingly, it may still be preferred to provide a plurality of ribs for thread inhibition, which are arranged distributed in the circumferential direction of the thread shaft.

According to a further embodiment, the thread inhibition is comprised of a layer of adhesive which is applied to the thread in one or more subportions of the thread shaft.

An adhesive layer also may ensure an increase in the frictional connection of the outer sides of the thread shaft of the ball pin and the inner thread of the thread opening which are abutting each other. Thus, in this way it is also possible to reliably adjust and retain an axial position of the ball pin within the thread opening. In this context, it may also be preferred to use the thread inhibition achieved via the adhesive in combination with a mechanical thread inhibition, for example in the form of a thread-inhibiting rib or structure.

According to a further design, the disc-shaped radial support structure may be formed circular or star-shaped or flower-shaped.

The disc-shaped radial support structure serves to protect the thread shaft or the shaft of the ball pin against excessive mechanical lateral loads with respect to the longitudinal axis of the ball pin. This is because such mechanical loads are transferred to the shaft portion via a further component connected to the ball head. Correspondingly, via these mechanical loads, bending torques can be generated in the thread shaft of the ball pin, which can impair the mechanical stability of the ball pin and/or the connection of ball pin and counter thread. In this context, in order to realize a dissipation of the mechanical loads of the thread shaft into the adjacent thread opening or the component with this thread opening, the radial support structure between ball head and thread shaft is provided. For this purpose, the thread opening may be formed in such a manner that there is a hollow cylindrical portion with an unthreaded radial inner wall adjacent to the entry opening in the thread opening. This inner wall provides the radial support portion for the radial support structure.

Due to the shape, the radial support structure may be molded into the support portion of the thread opening during the installation of the ball pin, so that the radial expansion of the support structure may be adapted to the inner diameter of the inner wall or the entry opening of the thread opening. This adaptation is achieved, for example, by a deformation of the radial support structure or by molding the support structure into the inner wall of the thread opening. In order to support this deformation or the forming of the radial support structure into the radial inner wall of the thread opening, it is formed in a star-shaped or flower-shaped manner. This means that not the entire outer circumference of the disc-shaped support structure abuts the inner wall. Instead, only subportions of the support structure abut the inner wall and can be deformed accordingly or molded into the inner wall. By means of this deformation or by molding the support structure into the inner wall, an optimum adaptation of the radial support to the inner wall of the thread opening which absorbs the mechanical loads is ensured.

According to a further design, a radial end portion of the disc-shaped support structure is regularly circumferentially interrupted or comprises tapered portions regularly spaced apart from one another, which supports a compressing deformation of the radial end portion radially inwards.

In order to ensure the above-mentioned radially inwardly directed deformability of the support structure for adaptation to the inner diameter of the thread opening in the entry portion of the thread opening, the disc-shaped support structure may be formed radially outwardly in a tapered manner. Accordingly, the thickness tapers radially outwards in the axial direction.

According to a further design, the disc-shaped support structure comprises apertures arranged regularly in the circumferential direction, so that the radial support structure is also weakened by this. Accordingly, it may be preferred that the radial support structure is compressed and thus deformed in a radially inward direction by the mechanical loads acting. In the same way, it may be preferred that the mechanical loads transmitted from the ball head to the thread shaft are concentrated and thus reinforced by the outwardly created tapers or by the existing portions between the apertures. The so resulting strengthening of the mechanical stress conditions during a loading condition supports the forming of the radial support structure into the inner wall of the thread opening, as also mentioned above.

According to a further design, the coupling head, in particular the ball head, has a driving means on a side facing away from the shaft. This drive means is arranged, for example, in an opening in order to allow a screwing tool to engage therein by means of a form fit in order to be able to turn the coupling pin in a desired direction.

The present disclosure also includes a screw connection of a coupling pin, which may be a ball pin, according to one of the designs described above, and a component with a thread opening which comprises at a radial inner wall a counter thread to the thread of the thread shaft and may be a hollow cylindrical entry portion with a supporting inner wall.

According to a further design, the thread opening in the component comprises a screw-in portion extending in the axial direction of the thread opening and a hollow cylindrical support portion, wherein the support portion is arranged adjacent to or neighboring to an entrance into the thread opening and the inner wall of the support portion forms a support wall for the disc-shaped support structure of the ball pin. It may also be preferred in this context that the support portion has a larger inner diameter than the screw-in portion.

In order to ensure the axial screw-in depth of the thread shaft of the ball pin in the thread opening, a plurality of deformed ribs are also provided for thread inhibition as well as the disc-shaped support structure, which is at least partially compressed in a radial edge portion.

According to another design of the screw connection, the thread opening is comprised of a blind rivet nut fastened in the component or a thread insert or a component opening with an inner thread cut or produced therein.

The present disclosure includes an injection molding method by which the coupling pin, in particular a ball pin, according to one of the designs described above is manufacturable. This injection molding method comprises the following steps: providing an injection mold which comprises the shape features complementary to the coupling pin, injection molding the coupling pin in the injection mold with a thermoplastic or another plastic material with or without fiber reinforcement and demolding the coupling pin from the injection mold.

Furthermore, the present disclosure describes an installation method of the coupling pin, in particular a ball pin, according to one of the designs described above in a component opening with a counter thread matching the thread of the coupling pin. The installation method comprises the following steps: screwing the thread shaft with the thread into the counter thread of the component opening, thereby deforming and/or removing the at least one rib for thread inhibition as well as turning the coupling pin into the component opening to such an extent that the disc-shaped support structure is supported with a radial outer portion at an inner side of the component opening.

According to a further installation step, it is intended that a radial outer portion of the disc-shaped support structure is deformed or cut at or into the inner wall of the component opening.

BRIEF DESCRIPTION OF THE DRAWINGS

The embodiments of the present disclosure are described in more detail with reference to the accompanying drawing. Showing.

DETAILED DESCRIPTION

Figure 5:
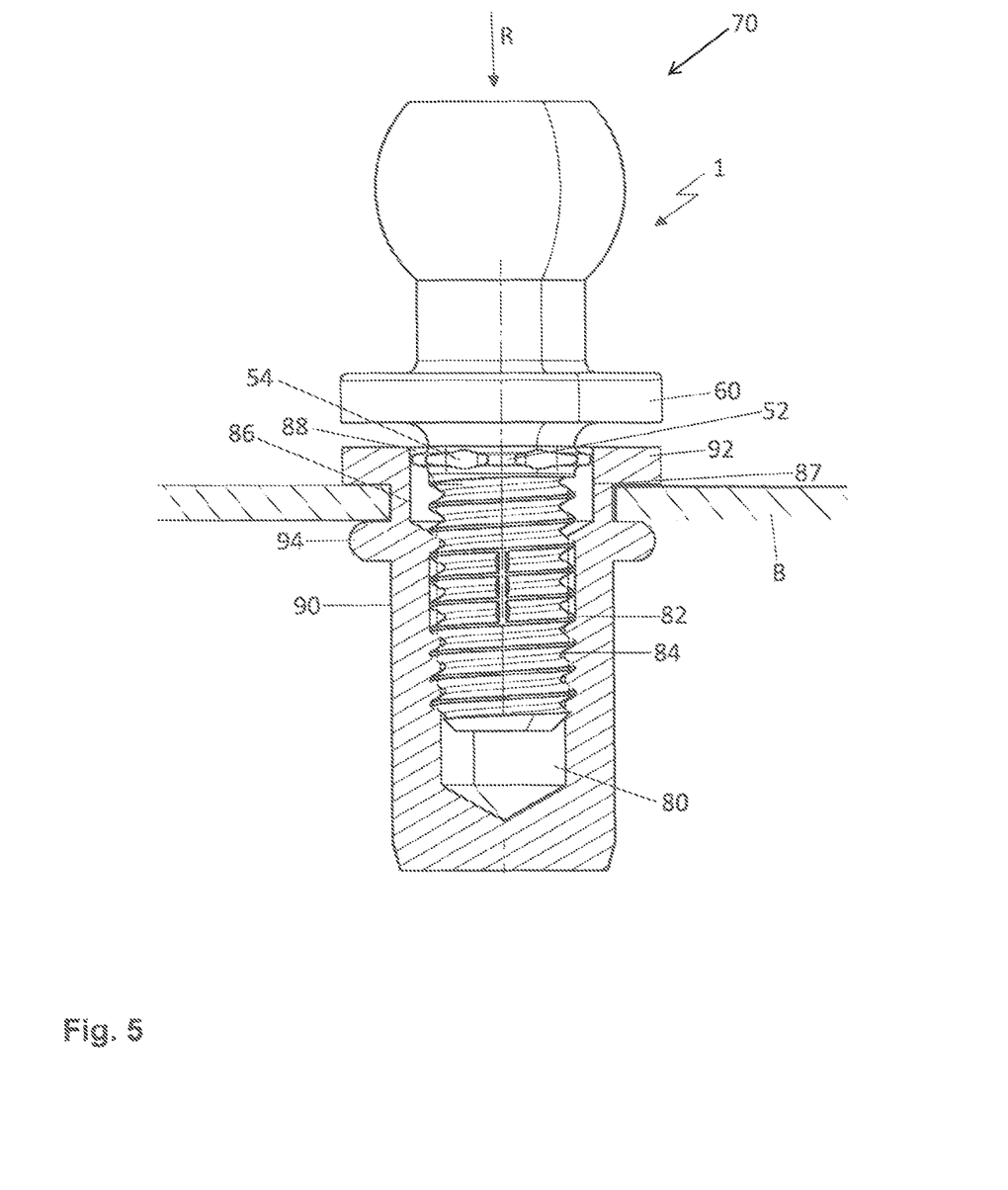
Figure 6:
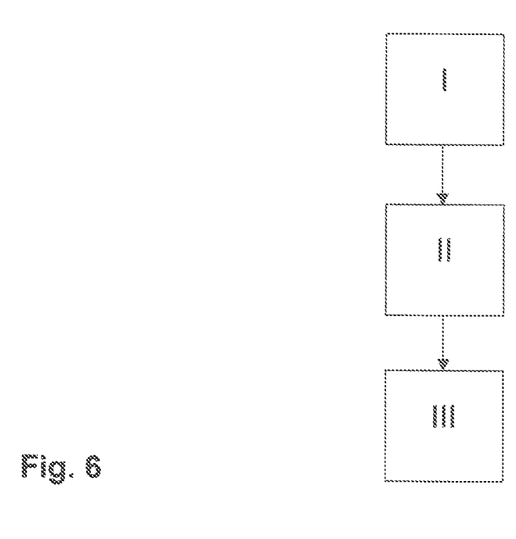
Figure 7:
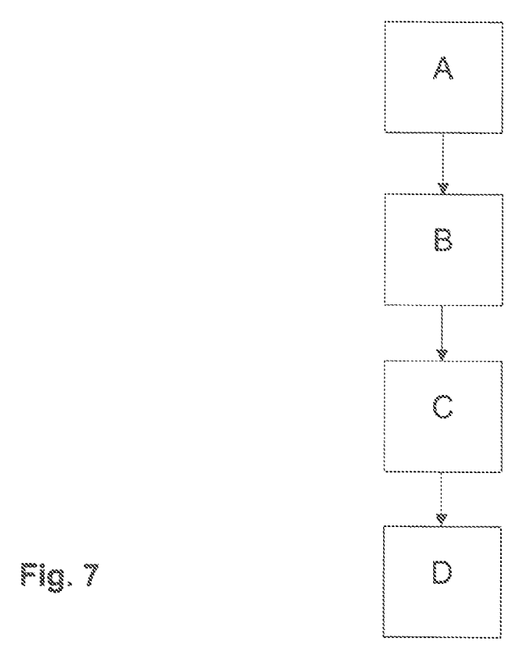
FIG. 7 a flow chart of an embodiment of an installation method of the ball pin in the thread opening.

In FIGS. 1 to 4, the ball pin 1 is shown in various views as an example of a coupling pin in an embodiment. Accordingly, FIG. 5 shows a screw connection 70 made of the ball pin 1, which is screwed into a thread opening 80 of a component B. The thread opening 80 is a bore or a thread insert fastened in or at the component B (not shown). In FIG. 5, the thread bore 80 may be formed by a blind rivet nut 90 fastened in an opening of the component B. For this purpose the blind rivet nut 90 is retained in a known manner between a circumferential end collar 92 and a crimped portion 94 at the component B.

The thread opening 80 of the blind rivet nut 90 is an example of a thread opening that would be provided by a thread insert or a bore directly provided in the component B. The thread opening 80 is comprised of at least two hollow cylindrical portions: a thread portion 82 and a support portion 86.

The thread portion 82 provides a counter thread 84, which interacts with a thread 30 of the ball pin 1. The counter thread 84 in the thread portion 82 may be a pre-formed thread or a thread cut or grooved by the thread 30 of the ball pin 1. The counter thread 84 engages with its thread web 84, which extends circumferentially over several turns, in the valleys of the thread 30 of the ball pin 1.

Contrary to a screw-in direction R above the thread portion 82, the support portion 86 is provided. This may be located adjacent or neighboring to an entry opening 88 of the thread opening 80. The support portion 86 provides a supporting radial inner wall 87, which may be formed continuously circumferential or all-round. The supporting inner wall 87 interacts with a support structure 50 of the ball pin 1, which is explained in detail below.

The ball pin 1 comprises a ball head 10 and an adjoining thread shaft 20 with a thread 30. Adjacent to the thread 30, the support structure 50 is provided, which is formed disc-shaped with a radial extension with regard to the central longitudinal axis L of the ball pin 1. The support structure 50 may be arranged adjacent to or neighboring to the axial end of the thread 30 facing the head.

It may also be preferred to position the support structure 50 still within the axial end portion of the thread 30 facing the head. An essential factor in the axial position of the support structure 50 on the thread shaft 20 is the alignment or arrangement of the support structure 50 within the hollow cylindrical support portion 86 in the screw connection 70, as illustrated in FIG. 5. This is because the support structure 50 dissipates lateral mechanical loads on the thread shaft 20 via a support at the inner wall 87 into the component B. The ball head 10 absorbs mechanical stress conditions in any orientation in space for example via a connection to another component. Since the ball pin 1 may offer no further support, the loading mechanical stress conditions are transferred to the thread shaft 20 and are dissipated from there into component B. In order to mechanically relieve the thread shaft 20 in this respect, the support structure 50 is provided.

According to a further embodiment of the ball pin 1, a support collar 60 is provided. This would also dissipate mechanical load conditions into the component B if it were to be supported in the screw connection 70 according to FIG. 5 at the component B or at the edge of the entry opening 88, such as at the end collar 92.

The thread 30 on the thread shaft 20 is designed as a standard thread, such as a metric thread, or as a special thread, depending on the case of application. The thread 30 engages in the thread 84 of the thread portion 82 or cuts or furrows or grooves it initially on its own in the thread portion 82.

Various practical applications require a defined axial positioning of the ball pin 1 within the thread opening 80. For this purpose, the ball pin 1 maintains the set axial position even in the case of a mechanical load. Therefore, at least one thread inhibition 40 may be provided at the thread shaft 20 in the axial portion of the thread 30.

According to a further design, the at least one thread inhibition 40 is comprised of at least one web-like structure or rib which overlays several thread webs of the thread 30. This mechanical thread inhibition 40 is deformable and/or removable when the thread shaft 20 is screwed into the thread opening 80, in particular when the thread 30 is screwed into the counter thread 84 of the thread portion 82. Due to the deformability and/or to the removability of the mechanical thread inhibition 40, the thread inhibition 40 remains at least partially intact in a gap between the thread 30 and the counter thread 84 and increases the frictional connection between the thread shaft 20 and the thread opening 80. This additional frictional connection may secure the axial position of the thread shaft 20 in the thread opening 80.

It has been proven to be advantageous if the web-like structure or rib 40 extends parallel to the longitudinal axis L of the thread shaft 20. It has also been found to be a preferred advantage in at least some applications if a plurality of web-like structures or ribs 40 are arranged evenly distributed and spaced apart from one another along the circumferential face of the thread shaft 20. Accordingly, the strength of the thread inhibition 40 can be adjusted by the geometric number, arrangement and shape of the web-like structures or ribs 40.

It may also be preferred if the web-like structures or ribs 40 are arranged inclined on the thread 30 with respect to the longitudinal axis L. There, in the same way, they can fill valleys between adjacent turns or enlarge the radial extension of the thread webs.

According to a further embodiment, the thread inhibition 40 is comprised of punctiform elevations which are arranged distributed over the thread shaft 20. Since these elevations (not shown) are also deformable and/or removable, they realize the above described thread inhibition 40 in an analogue manner.

A further embodiment of the thread inhibition 40 provides for an adhesive layer (not shown) to be applied each in subportions of the thread 30. As soon as the screw connection 70 has been established, the at least one adhesive layer reinforces the frictional connection between the ball pin 1 and the component B or even creates a firmly bonded or material-bonded connection.

To prevent the thread inhibition effect from increasing further and further as the thread 30 is screwed into the thread portion 82, the mechanical thread inhibition 40 is limited to an axial subportion of the thread shaft 20. The thread inhibition 40 may be arranged eccentrically with regard to the axial extension of the thread 30 in the direction of the end of the ball pin 1 facing away from the ball head.

The ball pin 1 also includes the disc-shaped radial support structure 50. The latter is located between the ball head 10 and the thread 30 on the thread shaft 20. The support structure 50 may interact with the inner wall 87 of the support portion 86 of the thread opening 80 in order to dissipate off-axis mechanical loads of the ball pin 1 via the component B.

Also a radial extension of the support structure 50 may be larger than an inner radius of the support portion 86, which forms the counter contour to the support structure 50. This geometric coordination forms the basis for a compensation of tolerances between the support structure 50 and the support portion 86. Because when the ball pin 1 is screwed into the thread opening 80, the support structure 50 may be at least partially sheared off and/or deformed and/or digs into the inner wall 87 of the support portion 86. This deformation process of the support structure 50 when establishing the screw connection 70 may ensure a reliable and play-free support or a support which is free of clearance between the support structure 50 and the support portion 86.

In order to support or facilitate the adaptation of the radial extension of the support structure 50 to the support portion 86, the support structure 50 has a circular or star-shaped or flower-shaped form. Accordingly, radially projecting sections 52 which are arranged in a circumferentially evenly distributed manner and radially recessed sections 54 are present (see FIG. 1, 2, 4).

Figure 1:
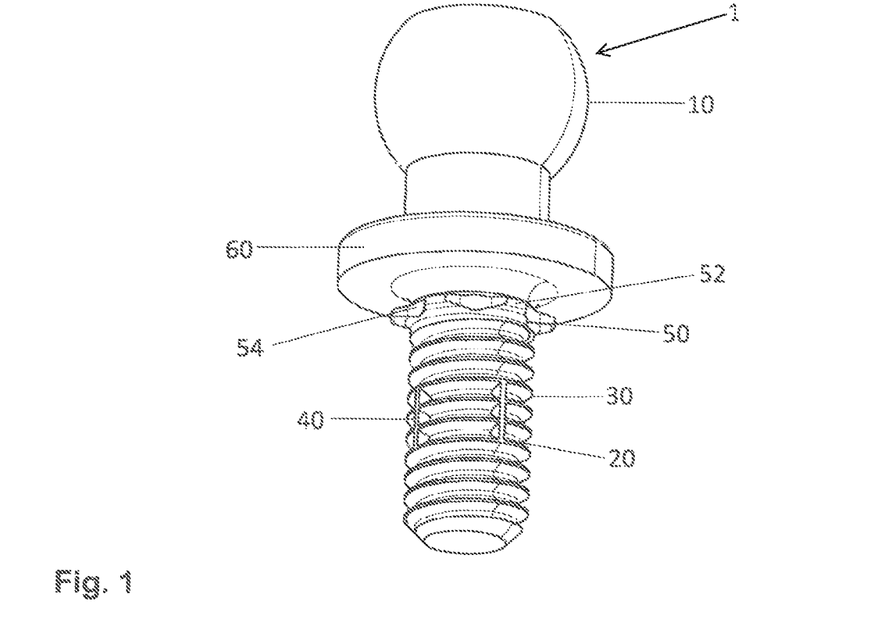
FIG. 1 a perspective side view of the ball pin with thread shaft.
Figure 2:
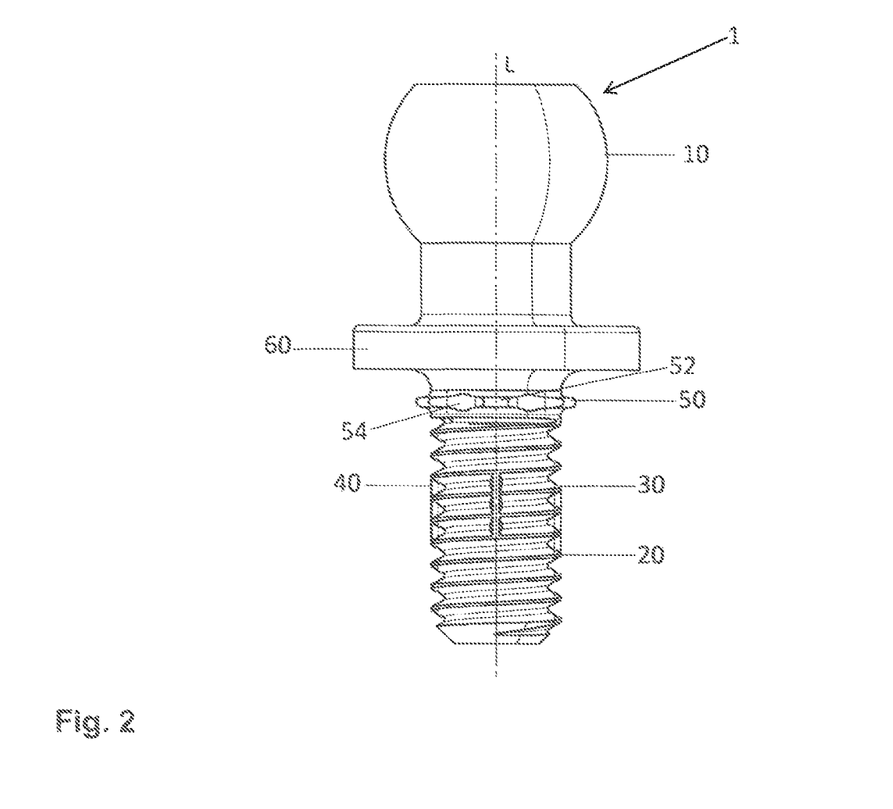
FIG. 2 a side view of the ball pin according to FIG. 1.
Figure 3:
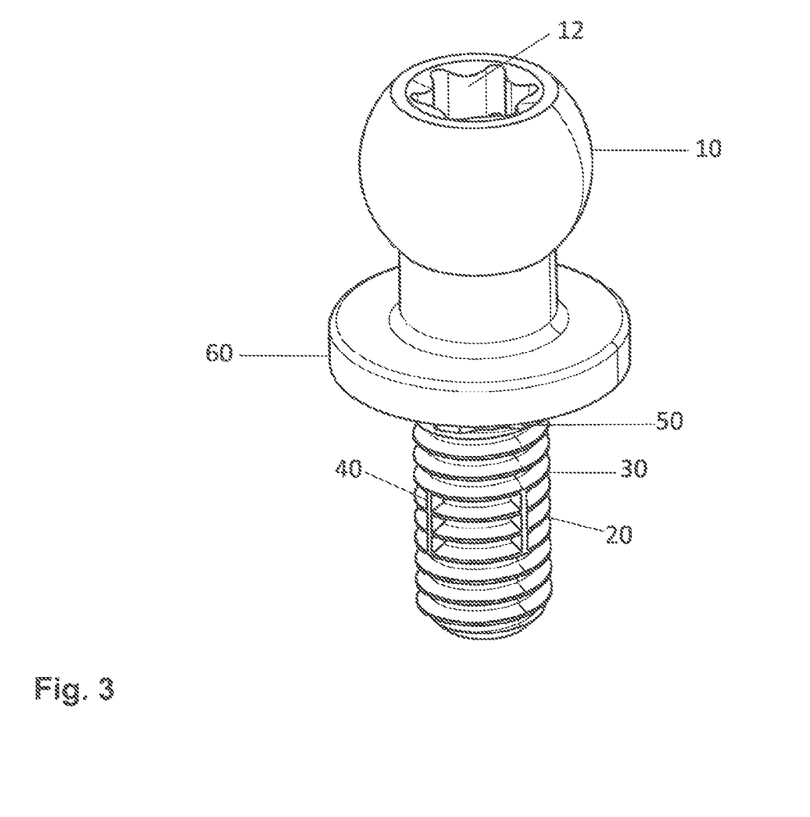
FIG. 3 a perspective view of the ball pin according to FIG. 1.
Figure 4:
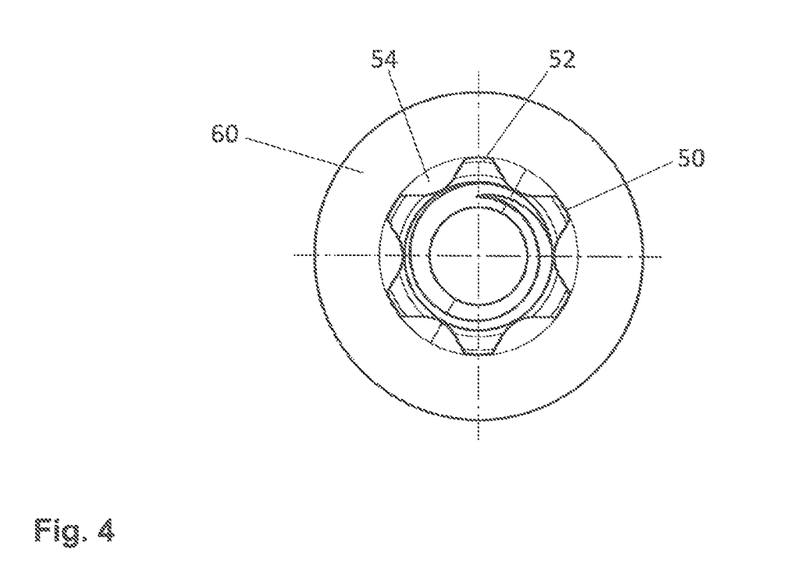
FIG. 4 an axial top view of the ball pin from the side of the ball shaft according to the embodiment of FIG. 1, FIG. 5 a schematic representation of the screw connection between ball pin and thread opening, wherein the thread opening is shown in a side sectional view, FIG. 6 a flow chart of an embodiment of a manufacturing method of the ball pin.

According to a further design, the radial end portion of the support structure 50 is regularly circumferentially interrupted or has tapered portions which are regularly spaced from each other. The radially outward taper is shown in FIG. 1.

The various alternatives of the above shaping, which may be used alone or in combination, ensure a compressing, radially inwardly directed deformation of the support structure 50 and/or facilitate a molding of subportions of the support structure 50 into the inner wall 87 of the support portion 86.

In order to screw the ball pin 1 into the thread opening 80, a drive means 12, such as a Torx drive, may be provided at the ball head 10.

The ball pin 1 is manufactured according to the present invention by means of an injection molding method. For this purpose, an injection mold is first created in a first step. This injection mold has geometrical shape features which are formed complementary to the characteristic constructive features of the ball pin 1. In a subsequent step, the injection mold is filled with liquid plastic. A thermoplastic or other plastic with or without fiber reinforcement may be used for this purpose. The ball pin 1 is manufactured according to common parameters and methods of the injection molding technology. Finally, the injection-molded ball pin is removed from the injection mold after cooling off.

In addition, the present disclosure includes an installation method of the ball pin 1 as it has been described above according to different embodiments. As part of the installation method, the ball pin is screwed into the thread opening 80 of the component B in such a manner that the thread 30 of the thread shaft 20 produces a reliable thread connection with the counter thread 84 of the thread portion 82. This is done in the first step of the installation method, in which the thread shaft is screwed into the component opening 80. During the screwing in, the deforming and/or removing of the at least one thread inhibition 40, which may be formed as at least one rib or as a web-like structure, takes place in a parallel installation step. With the help of the deformation and/or removal of the thread inhibition 40, the frictional connection between the interengaging threads 30, 84 is specifically increased in order to ensure and stabilize an axial position of the screwed-in ball pin 1 in the thread opening 80. Correspondingly, in the final step, the screwing-in of the ball pin into the component opening takes place so far that the disc-shaped support structure 50 is supported by a radial outer portion on an inner side of the component opening 80. In this way, in addition to the defined axial position of the ball pin 1 within the thread opening 80, an additional lateral support of the ball pin 1 is provided via the support structure 50.

For a suitable adaptation to the tolerances between the radial extension of the support structure 50 and the inner diameter of the support portion 86, at least one radial edge portion of the disc-shaped support structure or of a differently shaped support structure is deformed and/or formed or cut into the inner wall 87 of the support portion 86. In addition to compensating for tolerances in the radial dimensioning of the support structure 50 and the support portion 86, the last-mentioned installation step ensures a direct abutment of the support structure 50 at the inner wall 87 of the support portion 86. In this way, it is ensured that the lateral mechanical loads on the ball pin 1, which are introduced via the ball head 10 into the thread shaft 20, can be dissipated to the surrounding component B. In this way, the stability of the ball pin 1 and its lifespan are supported.

The invention claimed is:

1. A coupling pin with a coupling head and a thread shaft, in which:
   a. the thread shaft comprises a thread in a longitudinal portion of the thread shaft which extends parallel to a central longitudinal axis of the thread shaft,
   b. a thread inhibition is provided within the longitudinal portion of the thread, wherein a frictional connection between the thread of the thread shaft and a counter thread engaging therein and being present at a radially inner wall of a thread opening is increasable by means of the thread inhibition, and
   c. a disc-shaped radial support structure is provided between the coupling head and the longitudinal portion of the thread, wherein a radial extension of the support structure is adaptable to a diameter of the thread opening so that the coupling pin is supportable against a lateral load with respect to the central longitudinal axis of the coupling pin within the thread opening, wherein
   d. the disc-shaped radial support structure is formed star-shaped or flower-shaped such that radially projecting sections and radially recessed sections are present which are arranged in a circumferentially evenly distributed manner and a radial end portion of the disc-shaped support structure is regularly circumferentially interrupted or comprises in the circumferential direction tapered portions regularly spaced apart from each other, which allows a compressing deformation of the radial end portion.

2. The coupling pin according to claim 1, in which the thread inhibition is comprised of a web-like structure or rib extending over several thread turns, which at least partially fills thread valleys and/or increases thread crests.

3. The coupling pin according to claim 2, in which the thread inhibiting web-like structure is deformable and/or removable during a screwing into a counter thread.

4. The coupling pin according to claim 3, in which the thread inhibition is at least one rib extending in the longitudinal direction of the thread shaft which is arranged centrally or eccentrically in the direction facing away from the head with respect to the axial extension of the thread on the thread of the thread shaft.

5. The coupling pin according to claim 4, which comprises a plurality of ribs for thread inhibition arranged distributed in the circumferential direction of the thread shaft.

6. The coupling pin according to claim 2, in which the thread inhibition is at least one rib extending in the longitudinal direction of the thread shaft which is arranged centrally or eccentrically in the direction facing away from the head with respect to the axial extension of the thread on the thread of the thread shaft.

7. The coupling pin according to claim 6, which comprises a plurality of ribs for thread inhibition arranged distributed in the circumferential direction of the thread shaft.

8. The coupling pin according to claim 1, in which the thread inhibition is comprised of an adhesive layer, which is applied to the thread in one or more subportions of the thread shaft.

9. The coupling pin according to claim 1, in which the coupling head comprises a drive means on a side facing away from the shaft.

10. A screw connection of a coupling pin according to claim 1 and a component with a thread opening, which at a radial inner wall comprises a counter thread to the thread of the thread shaft.

11. The screw connection according to claim 10, the thread opening of which in the component comprises a screw-in portion extending in the axial direction of the thread opening and a hollow cylindrical support portion, wherein the support portion is arranged adjacent to or neighboring to an entry into the thread opening and the inner wall of the support portion forms a support wall for the disc-shaped support structure.

12. The screw connection according to claim 11, in which the support portion comprises a larger inner diameter than the screw-in portion.

13. The screw connection according to claim 10, comprising a plurality of deformed ribs for thread inhibition as well as the disc-shaped support structure which is at least partially compressed in a radial edge portion.

14. The screw connection according to claim 10, in which the thread opening is comprised of a blind rivet nut fastened in the component or a thread insert.

15. An installation method of a coupling pin according to claim 1 in a component opening with a counter thread matching the thread of the coupling pin, comprising the following steps:
   a. screwing the thread shaft with the thread into the counter thread of the component opening,
   b. thereby deforming and/or removing at least one rib for thread inhibition as well as
   c. turning the coupling pin into the component opening so far that the disc-shaped support structure is supported with a radial outer portion at an inner side of the component opening.

16. The installation method according to claim 15, with the further step:
   deforming or cutting a radial outer portion of the disc-shaped support structure at or into the inner wall of the component opening.

* * * * *